US007672637B2

(12) United States Patent
Steele et al.

(10) Patent No.: US 7,672,637 B2

(45) **Date of Patent: *Mar. 2, 2010**

(54) METHOD AND SYSTEM FOR DELIVERING FROM A LOUDSPEAKER INTO A VENUE

(75) Inventors: Michael Steele, Seaford, NY (US); David Franklin, Somerville, MA (US)

(73) Assignee: Audiological Engineering Corp., Somerville, MA (US)

( * ) Notice: Subject to any disclaimer, the term of this patent is extended or adjusted under 35 U.S.C. 154(b) by 903 days.

This patent is subject to a terminal disclaimer.

(21) Appl. No.: 11/363,274

(22) Filed: Feb. 28, 2006

(65) Prior Publication Data

US 2006/0217061 A1 Sep. 28, 2006

Related U.S. Application Data

(60) Provisional application No. 60/656,917, filed on Mar. 1, 2005.

(51) Int. Cl.

| | |
|---|---|
| ***H04H 20/71*** | (2008.01) |
| ***H04M 1/00*** | (2006.01) |
| ***H04B 1/38*** | (2006.01) |

(52) U.S. Cl. .................. 455/3.01; 455/575.1; 455/90.1; 455/550.1

(58) Field of Classification Search ................ 455/3.01, 455/3.02, 3.04, 3.05, 3.06, 426.1, 426.2, 455/465, 66.1, 575.1, 90.1, 550.1

See application file for complete search history.

(56) References Cited

U.S. PATENT DOCUMENTS 5,239,683 A * 8/1993 Usui ......................... 455/63.1
5,426,641 A 6/1995 Afrashteh et al.
5,589,796 A * 12/1996 Alberth et al. .............. 330/133
5,818,321 A * 10/1998 Muramatsu et al. ......... 337/198
5,818,328 A * 10/1998 Anderson et al. ...... 340/384.72
5,850,601 A * 12/1998 Aida et al. ............... 455/426.1
6,397,037 B1 * 5/2002 Franklin et al. ............ 455/3.01
6,978,242 B2 * 12/2005 Hamada ..................... 704/503
7,076,277 B2 * 7/2006 Kim et al. ................ 455/569.1
7,149,475 B2 * 12/2006 Kawamura ................. 455/41.2

(Continued)

OTHER PUBLICATIONS

Nordic Semiconductor, "Nordic Launches nRF24Z1-an Industry First Single Chip 2.4GHz 4Mbit/s Solution for CD-Quality Wireless Audio Streaming, with Extremely Low Latency", *Press Release*, May 2005, www.nordicsemi.no.

*Primary Examiner*—Tilahun Gesesse
(74) *Attorney, Agent, or Firm*—Edell, Shapiro & Finnan, LLC

(57) ABSTRACT

Spread-spectrum technology, either direct sequence or frequency hopping, or a combination of the two, is used for transmitting audio signals one way and control signals two ways over an RF channel(s) to reduce interference with/from other RF transmissions and enabling use of multiple such systems in close proximity without requiring pre-selection of transmission frequencies. Alternatively, multiple channels with appended access codes may be used, wherein interference or loss of clear signal results in automatic switching to another channel. The control signals accompany the transmitted audio signal at some time in the transmission interval, or previous to the beginning of the transmission interval, and constitute a coded control message allowing a unique connection. In some cases the encoding keys may only occur at the beginning of the desired message, while in other cases the two-way control signals may continue throughout the interval of the message link.

15 Claims, 4 Drawing Sheets

U.S. PATENT DOCUMENTS 7,158,499 B2 * 1/2007 Anderson et al. ........... 370/338
7,233,808 B2 * 6/2007 Mooney et al. ............. 455/557
2004/0203697 A1 * 10/2004 Finn ........................... 455/420
2005/0036560 A1 * 2/2005 Lu et al. ..................... 375/257

* cited by examiner

METHOD AND SYSTEM FOR DELIVERING FROM A LOUDSPEAKER INTO A VENUE

CROSS REFERENCE TO RELATED APPLICATIONS

This application claims priority from U.S. Provisional Patent Application Ser. No. 60/656,917, entitled "Improved RF Amplification System", and filed Mar. 1, 2005. This application also discloses an improvement of the systems and methods disclosed in our U.S. Pat. No. 6,397,037, issued May 28, 2002. The disclosures in the aforesaid application and patent are incorporated herein by reference in their entireties.

BACKGROUND OF THE INVENTION

1. Technical Field

The present invention pertains to improved RF amplification systems and methods for use in classrooms and other venues. The invention is described in the context of an improvement of the system and methods disclosed in our U.S. Pat. No. 6,397,037, issued May 28, 2002, the entire disclosure from which is incorporated herein by reference.

2. Discussion of Related Art

U.S. Pat. No. 6,397,037 (Franklin et al) describes methods and apparati for transmitting audio signals one way and control signals of various types, two ways, over an RF channel (or channels) in such a manner as to reduce the chance of interfering with or being interfered by, other RF transmissions, and for enabling the use of a multiplicity of such systems in close proximity without having to pre-select appropriate transmission frequencies. In other words, the Franklin et al patent describes methods and apparati that enable multiple audio transmissions via RF means in close proximity without their interfering with one another and with no manual adjustments to equipment required.

It is the purpose of the present invention to expand on and improve the methods and apparatus described in the Franklin et al patent.

SUMMARY OF THE INVENTION

Briefly, the preferred embodiment of the present invention utilizes spread-spectrum technology, either of the direct sequence type, or frequency hopping or a combination of the two. One embodiment of the invention focuses on the use of Bluetooth technology utilizing the synchronous mode (SCO). It is desirable to use wide band audio, of 6 KHz or greater, preferably greater, which requires modifications to the usual realization of the SCO methods.

Embodiments of the present invention, using the various realization methods and approaches, apply to use in classrooms and other venues such as: wireless public address systems; wireless amplification systems in halls and churches; wireless systems used for transmitting voices and music and other sounds from radios and/or televisions to remote loudspeakers, recorded sounds such as music and speech from devices such as i-pods and other recording objects, both analog or digital, to name a few. It will be evident to those familiar with the range of wireless applications that there are other applications for the principles described herein.

For some of these applications, where listeners are simultaneously observing live images of the talker or other performer (e.g., in the case of musical presentations), the issue of time delay, or "latency" as is it is often referred to, between the visual image and the transmitted sound becomes important. More particularly, consider the situation where an individual, or group of individuals, are watching a talker while listening to her voice. As is generally known by those engaged in the study of speech perception, time delays between the perception of the spoken sounds, on the one hand, and the motion of the talker's mouth, on the other hand, that exceed about 20 milliseconds result in disconcerting, confusing sensory perceptions. As a rough guideline, it is generally desirable that such time delays be kept below approximately 15 milliseconds. Accordingly, for those venues that can be described as "real time" and involve simultaneous perception of sounds and visual perception of sound sources, special consideration must be given to inherent latency provided by the processing methods for the audio signals. These considerations of course extend to broadcasts of materials containing both visual and auditory materials so, in this context, television or film presentations, shall herein be considered as "Real Time".

Specifically in this context of "Real Time" transmissions involving both auditory and visual material, it is noted that in May 2005, Nordic Semiconductor of Oslo, Norway, announced the development of a new digital chip called the nRF24Z1 which is designed to allow audio streaming with a very low latency, programmable between 2 and 18 milliseconds. For the most part, asynchronous methods (ACL) have latencies on the order of 30 milliseconds or greater in contrast to synchronous methods (SCO) which generally exhibit low latencies on the order of 1 or 2 milliseconds. Accordingly, for those applications which require low latencies and wide bandwidths the preferred embodiment utilizes either the modified SCO approach, or the newer ACL enabled by chips such as the nRF24Z1. For those applications requiring low latency but where narrower bandwidths will suffice, the choice would be the unmodified SCO synchronous method. The major difference between the two modes is that the ACL type allows extra error corrections for data errors by allowing multiple retransmissions prior to actually delivering the data load, in the present case, audio materials Apart from the methods of signal processing primarily described herein, namely, the two types of spread spectrum transmissions, direct sequence and frequency hopping, or combinations of the two, one can also address the main advantage offered by the Franklin et al patent (that is, unique presentation to a given base station, or a unique selection of multiple base stations) in other ways. One example is the use of multiple channels with appended access codes, wherein any interference or loss of clear signal is interpreted by the system to automatically switch to another clear channel. This operation may be automatic or manual, but for the embodiment described herein we are mainly concerned with the automatic type requiring no operator intervention.

A related method employs a plurality of channels operating simultaneously, wherein the processing system is arranged to accept and forward the data only from the channel or channels meeting some criteria of clarity. In this case, a key, or keys, must be inserted as a portion of the desired message such that other messages on the same carrier frequency are rejected, thus obtaining the desired link to the exclusion of other unwanted competing messages. In this kind of system, the keys may be transmitted one way with an appropriate response transmitted the other way, or the keys may be preprogrammed into both the receiver and the transmitter prior to use. In the context of the present invention, either use shall constitute a one way audio signal and a two way control signal.

The main goal of the invention is to obtain a clear unique signal path with little or no interference from other unwanted transmitters or noise sources. These and other techniques described herein may be either analog or digital, but in most case the preferred method is digital.

Bluetooth and many other spread spectrum technologies use specific assigned frequency bands, depending on the country of use, in the 2.4 GHz band, the 900 MHz band, the 5.8 GHz band and the new Ultra Wide Band (UWB). While for most applications these bands would be used for the present invention, other spectral bands do lend themselves to the same methods. Therefore, all ranges of spectral uses are considered as applicable for the present invention, including but not limited to IR frequencies and other possible electromagnetic frequency bands.

The above and still further objects, features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

What all these methods must have in common to meet the desired goal (namely, no required action by a user to reject unwanted signals, and that no interference between random transmissions and the desired signal) is that all transmissions must be accompanied by some sort of identification codes such that, in effect, there is an electronic "handshake" or recognition of a key or keys between the desired transmitter and receiver that is unique to the pair, or pairs, and that, in the event of interfering signals, some strategy is arranged to automatically reject the unwanted signal and receive the desired signal.

In some cases one should not refer to the unique character of the transmission as a "handshake" because the codes are contained in the message itself as a header or other predetermined location in the data stream. Hence, strictly speaking, it is not so much a "handshake" as it is embedded identification and/or control keys. The result is the same: only a specified message from a specified transmitter can be outputted to a user and the method of obtaining this end is two way transmissions of control signals, and one way transmission of audio signals.

From the above it is clear that all these methods must be accompanied, at some time in the transmission interval, or previous to the beginning of the transmission interval, with a coded control message allowing a unique connection. In some cases the encoding keys may only occur at the beginning of the desired message, while in other cases the two-way control signals may continue throughout the interval of the message link.

In the context of this invention, control signals or keys that occur during hang-up time of the transmitter, or that are pre-programmed into both the receiver and the transmitter thus making them a unique pair, shall be construed as a two-way control signal so far as the principles of the invention are concerned.

Referring back to spread spectrum methods, there is a distinction made within this technology, as well as in other types of digital transmission systems, wherein one kind of channel linkage is termed, "synchronous", while another kind is called "asynchronous". A synchronous channel contains guaranteed time slots and the end user uses them in sequence or order. An asynchronous channel contains no guaranteed time slots; that is, the end user receives data and assembles the message. If the end user uses error correction codes, then the order of the data can be varied or some of the data can be deleted and replaced with corrected data, thereby producing a delay referred to above as latency. In general, the asynchronous channel is always running (communicating), but in the case of a synchronous link, the link is established and error correction is not used. For the synchronous channel, if any correction is done, it is from the message inside the synchronous link (e.g., parity checks)

A distinction is often made on the basis of whether or not the transmission means includes a response on the part of the receiving equipment by sending a message back to the transmitter in question. When a received transmission results in a corresponding response transmission, the channel is described as asynchronous (ACL). This method allows for error correction procedures to be carried out, beyond those contained in the message packet itself, so that there is less chance of mistakes appearing in the message. However, a consequence of this strategy is that a longer time elapses for the effective transmission to be completed, resulting in longer latencies than is characteristic of synchronous channels. While this does not matter for some types of data transmittals, it is of great concern in the case of "real time" materials where "real time" is as defined above. In this context, then, one understands the applicability of the Nordic Semiconductor of the nRF24Z1 chip since it enables retention of the other advantages of asynchronous transmissions while providing a means for achieving low latency in those venues requiring it, specifically, "real time" situations.

Typically, synchronous realizations of the present invention will have no two way control signal occurring at the start of any link connection. Instead, the link is established when the receiver, sitting and waiting, receives a proper RF signal containing the correct key or instruction set which has been preprogrammed one way or another as described above. Using this key, the receiver will synchronize its RF system to "hop" according to the predetermined hop sequence, unique to that receiver/transmitter pair, and thus both the RF hop sequence and the further data keys contained in the signal will be matched for the duration of the message set. For present purposes this above sequence shall still be construed as one way audio transmission, and a two way control signal transmission, as stated above.

For an asynchronous realization, the sequence of the transmissions will contain both embedded keys and responding handshakes, although one can configure the method so that the responding transmissions are deleted after the initial contact. In this event, the latency will be decreased and the error correction methods will likewise be decreased.

The above and further modifications as might occur to one skilled in the art are all considered as part of this invention.

As used herein, "Voice Link Module" or "VLM" is used as a name for the overall system of the present invention.

DETAILED DESCRIPTION OF THE PREFERRED EMBODIMENTS

Figure 1:
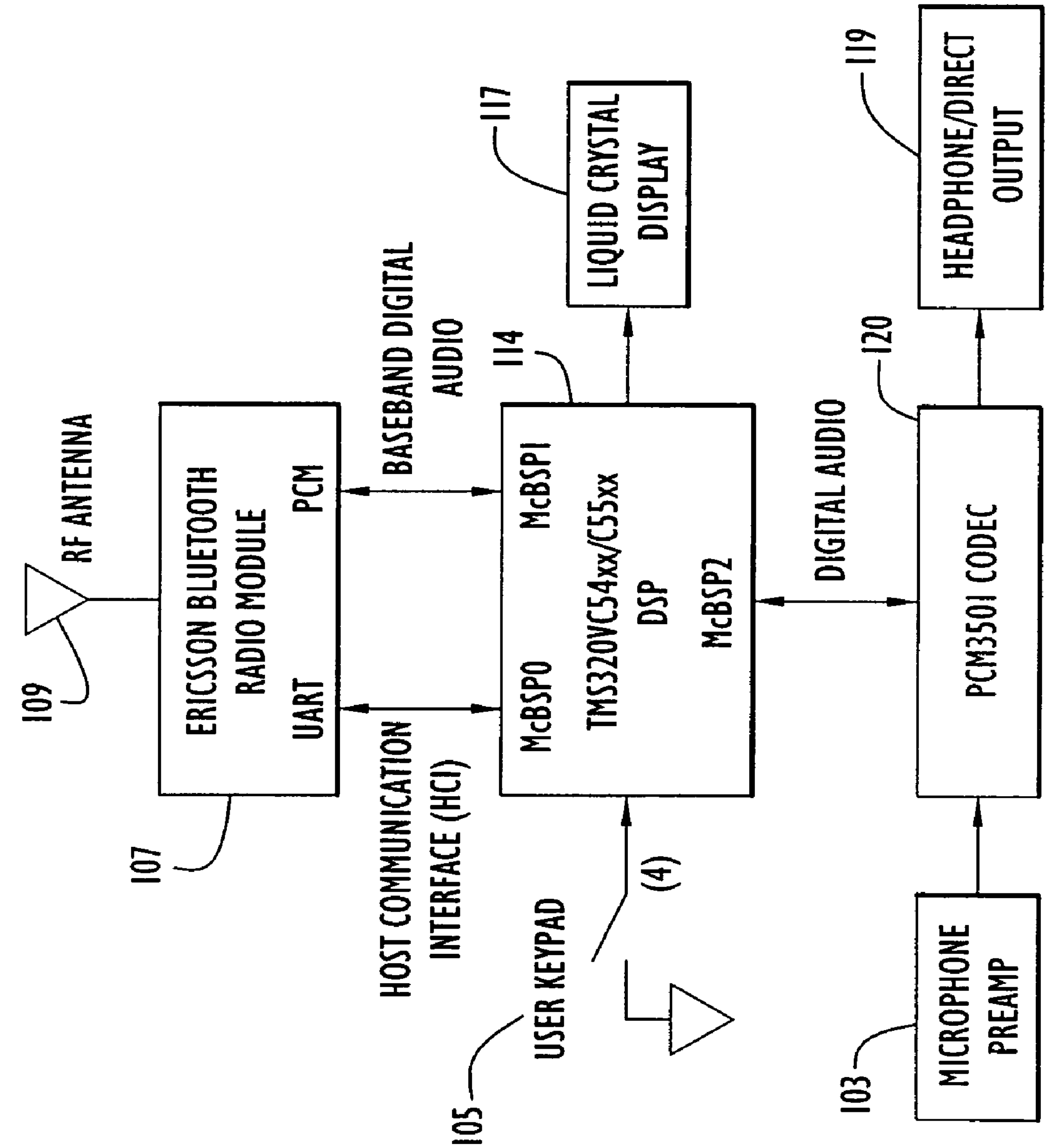
FIG. 1 is a diagrammatic illustration of the invention in the context of a classroom amplification context.

While the invention is susceptible of various modifications and alternative constructions, certain illustrated embodiments thereof have been shown in the drawings and will be described below in detail. It should be understood, however, that there is no intention to limit the invention to the specific form disclosed; on the contrary, the scope of the invention covers all modifications, alternative constructions, and equivalents falling within the spirit and scope of the invention as defined in the claims.

FIG. 1 is a diagrammatic illustration of the invention using a Bluetooth Radio Module and support elements as shown. Primary components in this embodiment include a microcontroller unit (114) (or alternatively a digital signal processor), a Bluetooth radio module (107) and an associated RF antenna (109). These components function in a conventional manner to assemble digital audio data into packets for serial transmission via the RF communication link. The microcontroller unit (114) is also responsible for transmitting and receiving digital audio in pulse-code-modulation (PCM) format (or alternative formats) between an analog to digital converter and digital to analog converter which, together, reside in the CODEC block (120). The user interface for this system includes a keypad or switch bank (105) and a liquid crystal display (117) which may be reduced to a set of light emitting diodes (LEDs) depending on the complexity of the desired display information. Microphone/preamp (103) is a source of audio signals and can be replaced by an alternative audio source such as the audio channel of a television or other audio source.

Bluetooth supports two types of logical connections: Asynchronous Connectionless Link (ACL); and Synchronous Connection Oriented Link (SCO). The ACL is often referred to as a packet-switched connection because no end-to-end connection is established between transmitting and receiving devices. Instead, data packets carry address and control information allowing the data to arrive and be received at its proper destination. ACL links are typically used for "bursty" or time insensitive data such as that from a keyboard. While it is possible to transmit audio over an ACL connection, associated delays can be disruptive in any Real Time situation.

In the present invention, the SCO synchronous link is the preferred method. In order to accommodate this approach, it is necessary to assure that the time delays in the audio signal did not exceed about 15 milliseconds. If this time delay is exceeded the net result is that, for those individuals in a given venue, hearing a combination of the direct sound (from the source) and the amplified sound (from loudspeakers) will create significant difficulties in comprehension and/or cause them to experience changes in sound quality due to an "echo effect". It was established that time delays in the SCO channel approach would not exceed about two milliseconds.

An SCO link is a logical end-to-end connection often referred to as a circuit-switched connection. The SCO link is a dedicated pathway, or pipe, that must be established prior to data transmission similar to those found on the Public Switched Telephone Network (PSTN). SCO data packets carry no address or control information because establishment of the SCO link explicitly determines which devices are involved in the connection. Establishment of the specific link is as described above in the Summary section.

Data transmitted via an SCO link is transmitted in periodic time slots and the only overhead associated with SCO data packets is error correction data which can be optionally removed depending on the application. An SCO link does not provide a retransmission mechanism because of the delays involved, and it is the responsibility of the error correction scheme, if used, to detect and correct errors in the data stream. An SCO link is an extremely efficient transmission channel due to the lack of overhead and guaranteed time of arrival for data packets. For these reasons the SCO link is the preferred method for transmitting time sensitive data such as real-time audio using Bluetooth.

SCO Packets and Time Slots:

Bluetooth specifications permit as many as three simultaneous SCO links to be established between devices. As part of the link establishment procedure the devices must agree upon the type of data packets that will be transferred and time slots that will be reserved for the packets. Bluetooth time slots are 625 μsec which correspond to the FHSS hop rate of 1600 hops/sec. The time division duplexing (TDD) scheme has been designed so that single slot packets are each transmitted via a different RF frequency.

Base band and Host Controller Interface:

As part of the Bluetooth architecture definition, two components are included to provide a communication path between the radio (RF transceiver) and a host processor. The Base band component is responsible for low level transfer of digital data to and from the radio, while the Host Controller Interface provides a connection between a host processor and the Base band processor. Base band functionality is implemented in hardware; the Host Controller Interface (HCI) it is typically implemented in software or firmware Another component of the architecture is the Link Manager (LM) which is responsible for handling messages related to link establishment, control, and security. The details of the LM are conventional and a detailed description thereof is unnecessary for the remaining sections.

Figure 2:
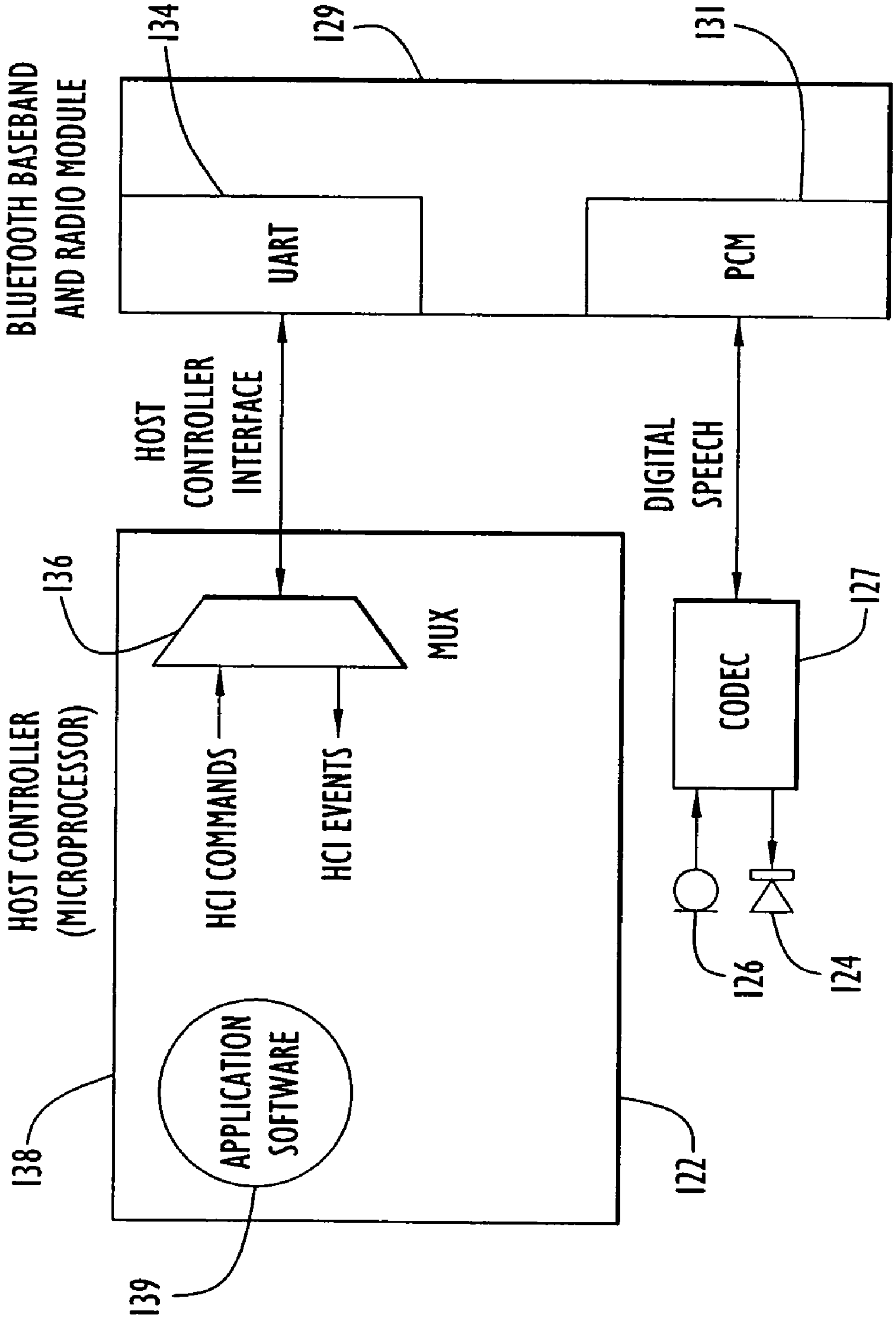
FIG. 2 is a block diagram of a typical narrow band SCO system using Bluetooth

A Typical Headset Application:

A typical Bluetooth headset comprises a microphone, a headphone amplifier, A/D and D/A (CODEC) converters, a Bluetooth radio module (single or multi-chip), and an inexpensive microcontroller. Referring specifically to FIG. 2, the most basic implementation using Bluetooth, utilizes a microcontroller (122,138) or microprocessor that is capable of running elementary software (136,139) which may include user inputs (keypad) and/or status outputs (LEDs). This software is responsible for configuring the Bluetooth radio (129) over the Hardware Controller Interface (HCI), typically by way of a simple serial interface known as a universal asynchronous receiver transmitter (134), or UART. Digital audio is input/output directly to/from the Bluetooth radio via the pulse-code-modulation (PCM) interface (131) found in essentially all voice enabled Bluetooth chipsets or modules. For a full-duplex arrangement the microphone (126), loudspeaker or headphone driver (124), and CODEC (127) are necessary although for half-duplex, or one way audio communication mode, only a subset of these components is necessary depending on whether the device is acting as an audio receiver or transmitter.

This device will establish a single SCO link with a Bluetooth enabled cellular or mobile telephone and support 64 Kbits/sec speech in both directions (full duplex). The speech signal is subjected to a sequence of operations prior to being wirelessly transmitted. On the transmit side, the microphone signal is first quantized by an analog to digital (A/D) converter. A/D converters for this application typically sample the speech signal at an 8 Khz rate, and amplitude resolution for the A/D is usually 16 bits, but any resolution between 12 and 16 bits will yield speech of reasonable quality. The data rate for 16 bit samples is 128 Kbits/sec (16 bits/sample @ 8K samples/sec). Before transmission is possible the data rate must be reduced to the capacity of a single SCO link (64 Kbits/sec). Bluetooth provides two methods for performing the data rate reduction; Log PCM and Continuous Variable Slope Delta (CVSD) modulation. Since CVSD is the superior method, it is that which is preferred for the present invention, and only that method is described in detail below.

The CVSD algorithm converts samples into a serial bit stream by using a single bit A/D converter and a variable step size predictor in a feedback loop. Similar to other types of delta modulators, the feedback loop is used to estimate the prediction error of the current output sample and to reduce that error in the next output. A key feature of the CVSD modulator is that it uses a variable step size in the predictor and eliminates two specific drawbacks of fixed step size delta modulators; namely, slope overload distortion, and granular noise. Slope overload distortion occurs when the slope of the signal is too large for the modulator's feedback network to track, and granular noise is the result of the modulator oscillating about a signal with a small slope. It is the variable nature of the step size that gives CVSD its name. A Bluetooth CVSD encoder first interpolates the 8K samples/sec speech data by a factor of eight to obtain a 64K samples/sec linear PCM data stream. This data is then passed to the CVSD encoder resulting in a data stream of 64 Kbits/sec that is transmitted over a single SCO link. An important requirement of the CVSD encoders used by Bluetooth is that the bandwidth of the digitized speech signal must be strictly limited to below 4 KHz.

Figure 3:
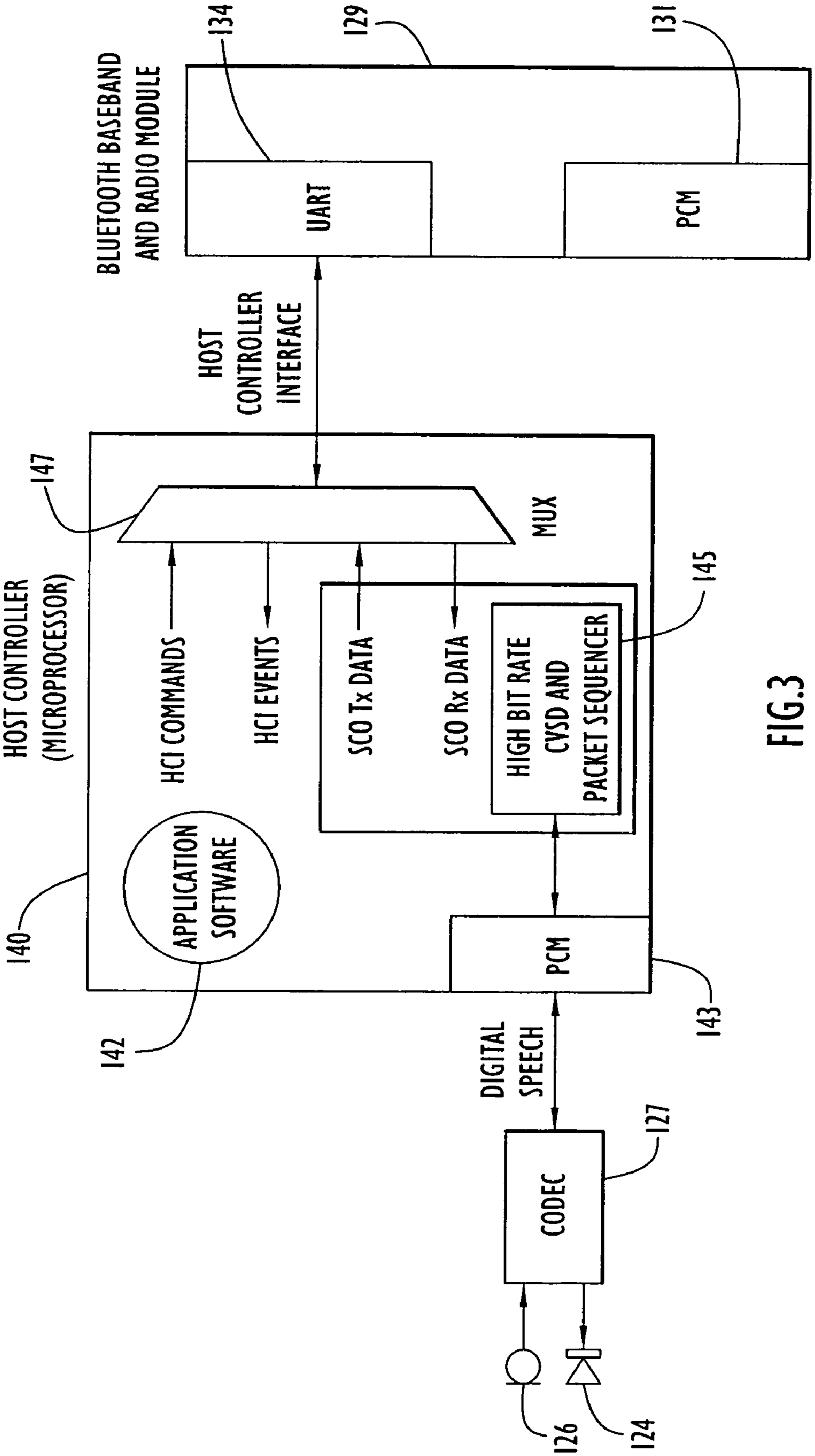
FIG. 3 is a block diagram of a wide bandwidth Bluetooth system using combined SCO channels

In the embodiment illustrated in FIG. 2, the PCM (pulse code modulation) block in the Bluetooth radio module is a hardware interface designed as a glueless connection to standard speech with bandwidths between 8 KHz and 12 KHz. FIG. 3 is a block diagram of the system of the present invention. Encoding of the speech through the PCM interface is controlled by the host processor. The method described below to obtain wideband transmissions makes changes to the architecture of FIG. 2 and relies on an advanced digital signal processor (DSP) for performing CVSD encoding at rates higher than that for the headset application.

Wideband Audio Application:

In the present invention, where it is desired to increase bandwidth, the prime requirement is to implement more than a single simultaneous SCO link between the Master (microphone/transmitter) and the Slave (stationary receiver/amplifier). In order to enable this, the typical headset functionality indicated in FIG. 2 requires changes in both hardware and software as described below.

Referring specifically to FIG. 3, the microcontroller unit has been replaced by a more sophisticated digital signal processor (140) that performs the same software functions (142, 147) as mentioned in previous sections, along with a set of additional tasks that include PCM (143) data stream management and encoding (decoding) software that support the higher bandwidth. In this embodiment the specialized encoding (CVSD and/or alternative) and decoding software components (145) are responsible for converting the PCM data into a format suitable for transmission over the RF interface. Similar to the embodiment of FIG. 2, external components still comprise a CODEC (127), microphone and preamp (126), loudspeaker or headphone driver (124), and a Bluetooth radio (129) including an HCI interface implemented over a hardware UART (134).

Hardware Requirements:

Because the PCM interface and CVSD encoders used with headsets are designed for narrow band speech transmission, it is necessary to eliminate them from the audio data path. However, because the high performance system still requires a robust method for encoding and decoding the audio, CVSD is still the encoder of choice, although the rates at which the signals are encoded must be increased significantly. In the preferred embodiment, audio signal encoding and decoding is performed by a DSP that replaces the microprocessor of FIG. 1 as the host controller. Additionally, the CODEC of FIG. 1 no longer is attached to the Bluetooth radio PCM interface. Instead it connects to the DSP PCM interface so that the DSP now resides between the PCM speech data and the Bluetooth radio. Another essential requirement for this embodiment is that the Bluetooth radio module must support a minimum of two, and preferably three, simultaneous SCO links yielding an aggregate data rate of between 128 Kbits/sec (Kbps) and 192 Kbps. These rates provide transmissions of high quality audio.

One of the implications of the modified architecture is that the universal asynchronous receiver transmitter (UART) now serves as both the HCI and serial audio data interface between the DSP and the Bluetooth radio. Because the UART now handles bidirectional HCI messages and bidirectional audio data, it must be capable of significantly higher transmission rates than those found in the headset application.

Software Requirements:

For the wideband application there are essentially two software modules required. Referring to FIG. 2, the first is the application software and the second is the HCI (Host Controller Interface). The application software includes the user interface and low level communications to the HCI, while the HCI serves as a gateway and is responsible for issuing commands to, and responding to, events from the Bluetooth radio. Although not strictly part of the HCI, device drivers must also be included to handle HCI message traffic through the UART hardware. These software components are included in the high performance system.

The broadband system has essentially the same functional characteristics as the headset system except that the DSP is now responsible for the entire audio signal processing between the Bluetooth module PCM and RF interfaces. The signal processing software must now include high bit rate CVSD encoders and decoders and packet sequencers that prepare encoded audio data for transmission between the HCI and the Bluetooth radio. In addition, a PCM device driver is written to handle serial audio data between the CODEC and the signal processing software.

Figure 4:
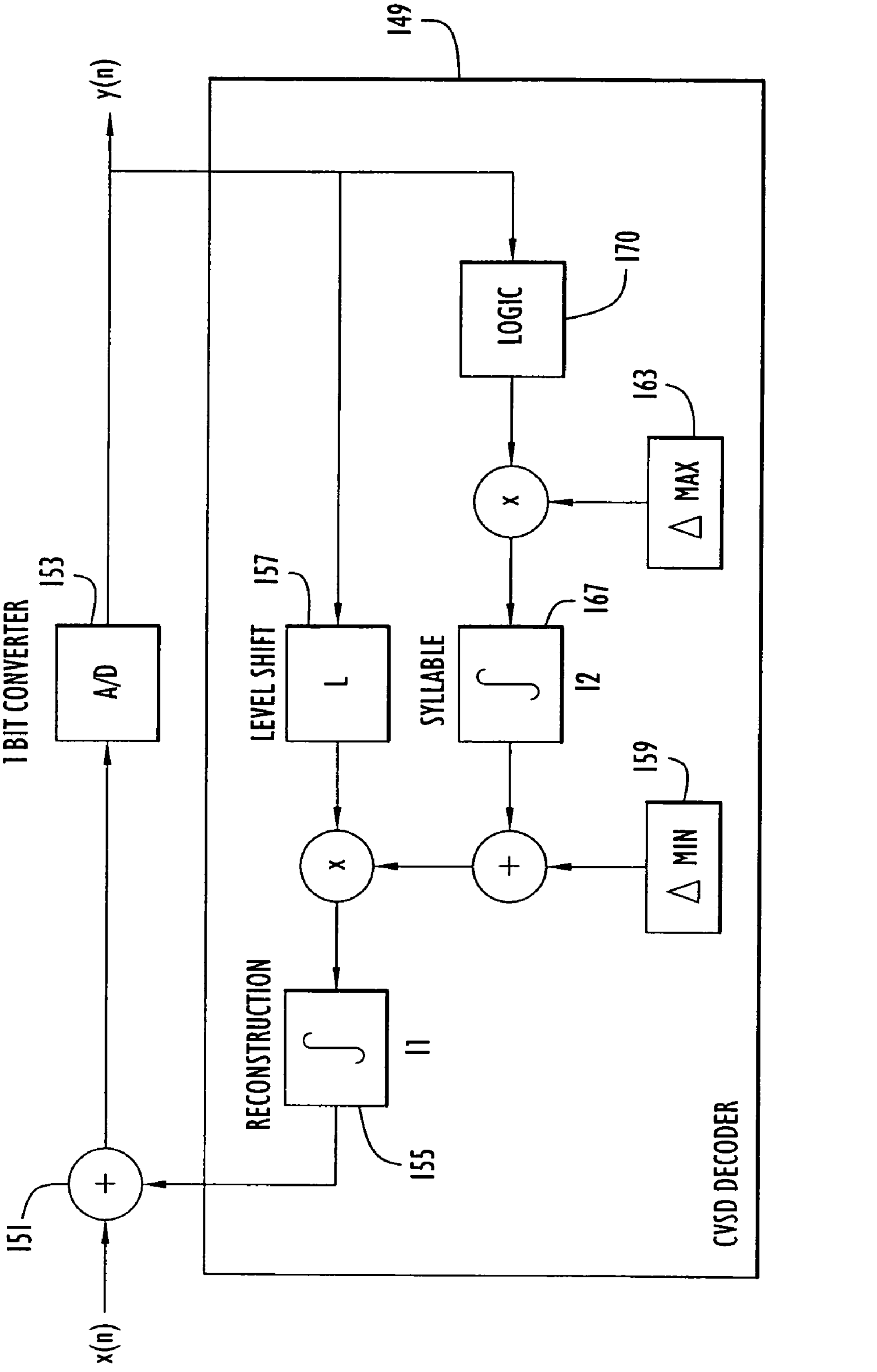
FIG. 4 is a functional block diagram of a continuously variable slope demodulator

Referring now specifically to FIG. 4, the Continuously Variable Slope Delta modulator shown uses basic discrete processing components for encoding PCM audio (16 bit amplitudes) at some sample rate, $F_s$, to a serial data stream (1 bit amplitude) at a much higher sample rate ($N*F_s$). The encoder comprises a difference block (151), a one bit analog to digital converter (153) which determines the sign of the current "error" output from the difference block, a shift register (170), two discrete integrators (155, 167), and two limit blocks that output constant values depending on past results (159, 163). The Level Shift (157) converts the bipolar (+/−1) signal output from the A/D converter to a unipolar value (0/1) used in the following multiplier.

As mentioned herein, a particularly useful application for the technology of the present invention is in classroom amplification systems. In essence, these systems depend on some kind of transmitter and microphone worn by or otherwise associated with the instructor, a receiver/audio-amplifier installed in the classroom, and a number of loudspeakers arrayed about the classroom. These systems amplify the instructor's voice throughout the room so that all students can hear without strain, even if they have mild, untreated hearing loss. In practice, prior to the invention described in the Franklin et al patent, the problem of signal interference in classroom amplification systems limited deployment of such systems. The enhancement provided by the improvement described herein is expected to be particularly beneficial to classroom amplification systems.

It will be understood that modifications and variations of the above described exemplary embodiment can be made without departing from the scope of the invention. In particular, one or more transmitter(s) can be paired with a single receiver, or one or more receiver(s) can be paired with a single transmitter. For example, it may be desirable to transmit several sources to one receiver station, or alternatively, have one transmitter transmit to several receiver stations.

More generally, an RF type amplification system according to the present invention can employ a variety of interference reduction/avoidance techniques which use either embedded keys, as keys are defined above, or handshake protocols, in the sense of handshakes as defined above, to attain the unique connection of a pair, or pairs, of transmitter and receivers such that they, in effect, transmit audio one way and control signals two ways, and fall within the claims and spirit of this invention.

Having described a preferred embodiment of a method and apparatus for improving wireless audio transmission according to the present invention, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method for delivering into a venue from a loudspeaker at least at one remote location an acoustic output signal derived from an acoustic source signal generated at least at one source location, said method comprising the steps of:

at said least one source location:

(a) generating an audio source signal corresponding to said acoustic source signal;

(b) generating a first control signal containing data including at least address information, error correction information, decoding information and other information pertaining to said audio source signal;

(c) generating a first RF signal;

(d) encoding said first RF signal with said audio source signal and said first control signal with sufficient information to provide sound bandwidth permitting faithful reproduction of the audio source signal after transmission;

(e) from a source transmitter, wirelessly transmitting in spread spectrum or ultra-wideband bandwidth (UWB) format said first RF signal encoded as in step (d);

(f) at least at one source receiver, wirelessly receiving in spread spectrum or UWB format a second RF signal containing at least a second control signal and possibly but not necessarily a second audio signal;

(g) detecting said second RF signal and separating therefrom said second control signal, and, if present, said second audio signal;

(h) identifying and evaluating the separated second control signal for controlling transmission of the encoded first RF signal from said first transmitter in accordance with parameter values of the second control signal;

at said at least one remote location:

(i) at least at one remote receiver, wirelessly receiving the first RF signal transmitted in step (e);

(j) detecting said first RF signal received in step (i) and separating said audio source signal and said first control signal therefrom;

(k) identifying and evaluating the first control signal separated in step (j) and controlling delivery of the separated audio signal to said loudspeaker in accordance with parameter values of the first control signal;

(l) converting the separated audio signal separated in step (j) to said acoustic output signal at the loudspeaker if and only if said first control signal contains predetermined instructions to do so;

(m) generating the second control signal;

(n) generating the second RF signal;

(o) encoding said second RF signal with said second control signal; and (p) from at least one remote transmitter, wirelessly transmitting in spread spectrum or UWB format said second RF signal encoded with at least said second control signal but not necessarily an audio signal;

wherein steps (a), (d), (e), (i), (j), (k) and (l) include the step of preventing cumulative sound latency greater than 15 milliseconds in the acoustic output signal relative to said acoustic source signal;

thereby permitting utilization of one-way spread spectrum or UWB transmission of audio signals and two-way spread spectrum or UWB transmission of control signals between said source and remote locations to deliver said acoustic source signal to said venue as said acoustic output signal.

2. The method of claim 1 wherein said venue is a classroom, wherein said loudspeaker is located in a classroom, and wherein said audio signal is a person's voice.

3. The method of claim 1 wherein step (d) comprises digital encoding of said first RF signal by sampling said audio source signal and said first control signal at a sampling rate of at least 16K samples per second, and wherein step (j) comprises digital detecting of the received RF signal at a corresponding sampling rate.

4. The method of claim 1 wherein step (d) comprises analog encoding of said first RF signal by modulating that signal with said audio source signal and said first control signal in a modulation bandwidth of at least 6 KHz, and wherein step (j) includes analog detecting of the received RF signal with a corresponding demodulation bandwidth.

5. The method of claim 1 wherein said format is spread spectrum utilizing direct sequence or frequency hopping.

6. The method of claim 1 wherein steps (a) through (p) establish at least a one-way point-to-point audio link using two-way control signaling, and wherein said control signals may either be multiplexed throughout the time after such point-to-point audio link is established or terminate for as long as the audio link is maintained.

7. The method of claim 1 wherein said source and remote transmitters are programmed to provide said first and second control signals, respectively, and said source and remote receivers are programmed to recognize said second and first control signals, respectively, such that said source and remote receivers uniquely accept data from said remote and source transmitters, respectively, and reject data from un-programmed and improperly programmed transmitters.

8. The method of claim 1 wherein different RF bands are utilized for transmission of audio signals and control signals.

9. A system for delivering into a venue from a loudspeaker at least at one remote location an acoustic output signal derived from an acoustic source signal generated at least at one source location, said system comprising:

at said at least one source location:

an audio signal source for generating an audio source signal corresponding said acoustic source signal;

a first control signal source for generating a first control signal containing at least address information, error correction information, decoding information and other information pertaining to said audio source signal;

a first RF signal generator for generating a first RF signal;

a first encoder for encoding said first RF signal with said audio source signal and said first control signal with sufficient information to enable sound bandwidth permitting faithful reproduction of the audio source signal after transmission;

a first transmitter for wirelessly transmitting in either spread spectrum or ultra-wide bandwidth (UWB) format said first RF signal encoded by said first encoder means;

a first receiver for wirelessly receiving a second RF signal containing at least a second control signal and possibly but not necessarily a second audio signal;

a first detector for detecting said second RF signal and separating therefrom said second control signal and, if present, said second audio signal;

a first decoder for identifying the second control signal separated by said first detector and evaluating that separated second control signal for controlling transmission of said first RF signal by said first transmitter in accordance with parameter values of the second control signal;

at said at least one remote location:

a second receiver for wirelessly receiving the first RF signal transmitted by said first transmitter;

a second detector for detecting said first RF signal received by said second receiver and separating said audio source signal and said first control signal therefrom, wherein said second detector is compatible with said first encoding means;

a second decoder, compatible with said first encoder, for identifying and evaluating the separated first control signal for controlling delivery of the separated audio source signal to said loudspeaker in accordance with parameter values of the first control signal;

wherein said loudspeaker includes means for converting the separated audio source signal to said acoustic output signal if and only if said first control signal contains predetermined instructions to do so, properly addressed to second decoder means;

a second control signal source for generating the second control signal;

a second RF signal generator for generating the second RF signal;

a second encoder for encoding said second RF signal with said second control signal;

a second transmitter for wirelessly transmitting in spread spectrum or UWB format said second RF signal encoded by said second encoder; and wherein said audio signal source, first encoder, first transmitter, second receiver, second detector, and second detector include means for preventing cumulative sound latency greater than 15 milliseconds in the acoustic output signal relative to said acoustic source signal;

thereby permitting utilization of one-way spread spectrum or UWB transmission of audio signals and two-way spread spectrum or UWB transmission of control signals between said source and remote locations to deliver said acoustic source signal to said venue as said acoustic output signal.

10. The system of claim 9 wherein said venue is a classroom, wherein said system is a classroom amplification system, wherein said audio signal source is a person's voice, and wherein said loudspeaker projects the person's voice into said classroom.

11. The system of claim 9 wherein said first digital encoder includes means for digitally encoding said first RF signal by sampling said audio source signal and said first control signal at a sampling rate of at least 16K samples per second, and wherein said second encoder comprises digital detecting of the received RF signal at a corresponding sampling rate.

12. The system of claim 9 wherein said first digital encoder includes means for analog encoding said first RF signal by modulating that signal with said audio source signal and said first control signal in a modulation bandwidth of at least 6 KHz, and wherein second decoder includes analog detecting of the received RF signal with a corresponding demodulation bandwidth.

13. The system of claim 9 wherein at least one one-way point-to-point audio link is established using two-way control signaling, and wherein said first and second transmitters include means for transmitting said first and second control signals, respectively, multiplexed throughout the time after such a point-to-point audio link is established.

14. The system of claim 9 wherein both said first and second transmitters include program means for providing said first and second control signals, respectively, and said first and second receivers include means for recognizing said second and first control signals, respectively, such that said first and second receivers uniquely accept data from said second and first transmitters, respectively, and reject data from un-programmed and improperly programmed transmitters.

15. The system of claim 9 wherein at least said first and second transmitters each includes means for changing transmission of said RF signals to different RF frequency bands.

* * * * *